Dec. 15, 1942.    C. C. GOODSON ET AL    2,304,907
HYDRAULIC CLUTCH AND CONTROL MECHANISM
Filed Aug. 23, 1940    2 Sheets-Sheet 1
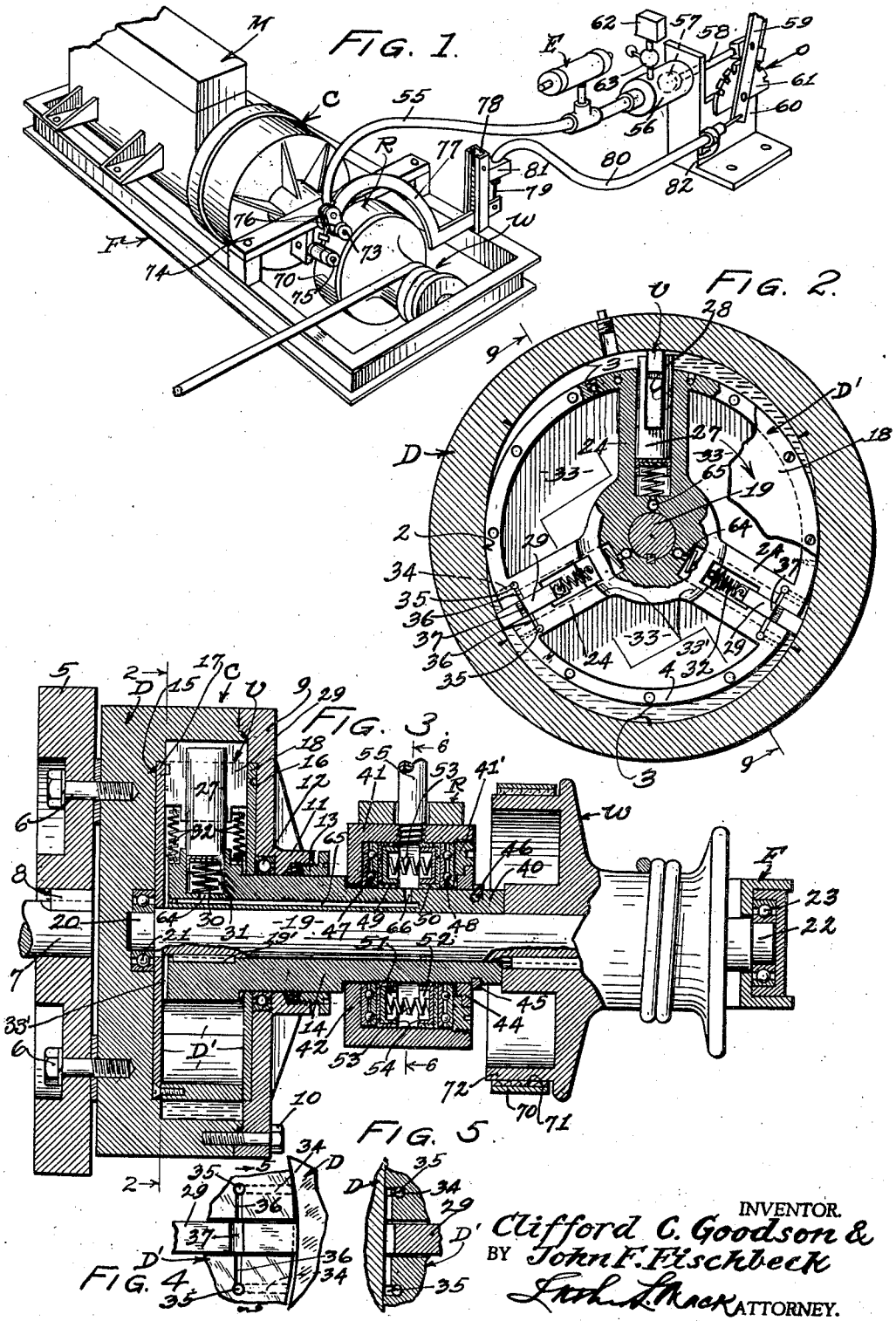
INVENTOR.
Clifford C. Goodson &
BY John F. Fischbeck
ATTORNEY.

Dec. 15, 1942.  C. C. GOODSON ET AL  2,304,907
HYDRAULIC CLUTCH AND CONTROL MECHANISM
Filed Aug. 23, 1940   2 Sheets-Sheet 2

INVENTOR.
Clifford C. Goodson &
BY John F. Eischbeck
ATTORNEY.

Patented Dec. 15, 1942

2,304,907

UNITED STATES PATENT OFFICE 2,304,907

HYDRAULIC CLUTCH AND CONTROL MECHANISM

Clifford C. Goodson, Pasadena, and John F. Fischbeck, Glendale, Calif.

Application August 23, 1940, Serial No. 353,876

12 Claims. (Cl. 192—60)

This invention relates to hydraulic clutches and transmission units adapted to be applied to and for effectively controlling the application of power from a motor to a winze or other heavy duty machine such as are used for road working, ditchers, diggers, dredges and the like, but is also capable of use in connection with automotive vehicles and relatively light machines, with equal facility and results.

Our invention is generally of the type shown in Letters Patent of the United States No. 2,201,878, granted May 21, 1940, to Harold J. Atkins and Seymour B. Bennett, and assigned to us, to which reference is made in the consideration of this invention comprising certain valuable and novel improvements over the mechanisms disclosed and claimed in said patent.

Briefly, this invention has for an object the provision of a hydraulic clutch or transmission mechanism including a driving member adapted for connection with the drive shaft of a motor or engine and an enclosed driven member adapted to be selectively coupled with said driving member by means of a suitable fluid contained in the outer driving member, said driven member being, in turn, suitably connected with and adapted to operate a winze or other desired machine unit. The driven element of our clutch has a plurality of radially extensible and retractible vanes whose outer extremities are adapted to continuously engage portions of the bore of the driving member in which the driven member is rotatable and which is so formed as to provide fluid receiving chambers between the periphery of the driven member and the wall of the driving member. Thus, under proper control, the fluid which completely fills the unoccupied portions of the driving and driven members, is continuously displaced to a desired extent from one point to another during the free rotation of the driving member within the driving member and also serves to lock the two members together for synchronous or relative rotation when and as required for controlling the operation of a desired machine.

Another object is to provide improved means for controlling the application and flow of the fluid in such a manner as to effect smoothness of operation and sensitiveness to manual regulation, and, moreover, to prevent leakage of the fluid from, as well as to retain the same, in desired chambers of the clutch unit under certain operating conditions.

Other objects will appear as the description of our invention progresses, reference being had to the hereinafter explained details of structure and requisites of operation and disclosed in the drawings appended hereto, subject, however, to modification, within the scope of the appended claims, without departing from the spirit of our invention.

In said drawings:

Fig. 1 is a perspective view of a mechanical unit embodying our improvements and operatively associated with a motor as a source of power and a combination brake and fluid control mechanism;

Fig. 2 is a vertical section of the clutch unit on line 2—2 of Fig. 3;

Fig. 3 is a horizontal section thereof on a plane cutting the axis of the clutch and including in addition to the clutch proper a suitable fluid control unit and a power operated winze;

Fig. 4 is an enlarged fragmentary face view of the driving member as is seen in Fig. 2 and showing a by-pass from one to the other side of one of the vanes of said driven member;

Fig. 5 is a fragmentary section of the structure shown in Fig. 4 as seen on line 5—5 of Fig. 4;

Figure 6:
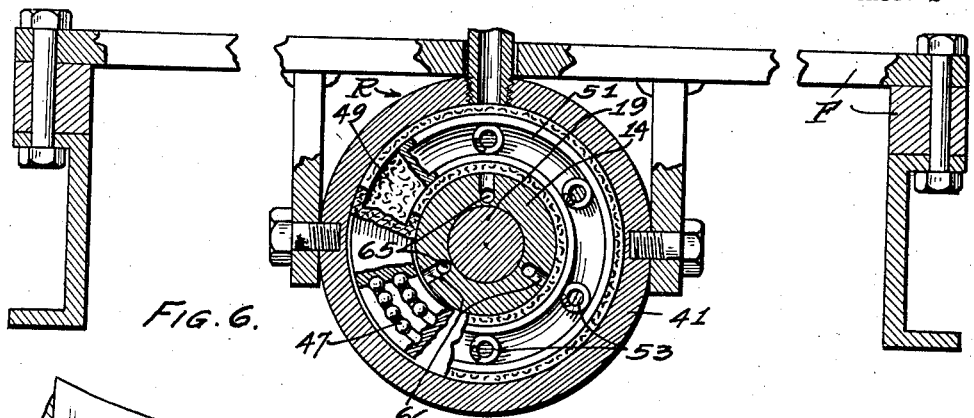
Fig. 6 is a vertical section of the fluid control unit on line 6—6 of Fig. 3.

In Fig. 1 we have shown an arrangement of our clutch unit C mounted in association with a motor M as a source of power and a winze W, all of which elements are supported as by means of a suitable frame F in axial alinement, and a suitable operating means generally represented at O. The clutch unit C embodies a driving member D and a driven member D' arranged with the driving member completely enclosing and forming a support for the driven member. Member D is of generally circular form and constitutes a cylinder-like element for rotatably receiving the member D' and to that end has a bore or recess 2 (Figs. 2 and 7) with extended portions 3, 3 which are eccentrically formed and constitute fluid chambers outwardly of the circular and concentric periphery or rim 4 of the driven member D'. By reference to Fig. 2, it will be observed that there may be two or more of the recess portions 3 with relatively short alternating portions therebetween which are concentric with and are adapted to closely engage the periphery 4 of member D'.

As shown in Figs. 1 and 3, member D may be detachably connected with motor M as by means of a plate or other coupling 5 secured to said member D by screws 6, 6, while said plate 5 may be operatively connected with the driving shaft 7 of motor M as by means of a key 8, or otherwise, so that member D will continuously rotate with shaft 7 of motor M. Member D includes a cover 9 attachable thereto as by means of bolts or screws 10 and said cover may have a hub 11 provided with a frictionless bearing 12 and a packing gland 13 for rotatably receiving a hub 14 of member D' which is fixed to a driven shaft 19 as by means of a key 19'.

The body D and cover 9 of the driving member are recessed at 15 and 16, respectively, to receive plates 17 and 18 which are attached to the opposite sides of member D' and have their inner faces flush with the inner surfaces of members D and 9, said plates being circular and concentric with the common axis of members D and D', as shown in Fig. 2. Member D' carries a shaft 19 which has its reduced inner end 20 held in a frictionless bearing 21 supported in member D while its outer end serves as a support for the winze W and is journalled at 22 in a frictionless bearing 23 carried on a portion of frame F.

In the form of device shown, driven member D' has three relatively thick ribs 24, 24, 24 which are radially extended from hub 14 outwardly to periphery 4 and have longitudinal bores 25 and laterally formed slots 26 on opposite sides of said bores for the purpose of slidably mounting vanes V, V, V, as hereinafter described. Each of the vanes V is composed of a stem 27 which is slotted at 28 to slidably receive and carry a blade 29, said blade being movable in slots 26 of member D'. Blades 29 are urged outwardly at their inner ends by means of compression springs 30 carried in bores 31 of hub 14 while the blades 29 are urged inwardly by means of springs 32 (see Fig. 3) which are suitably attached at their inner and outer ends to hub 14 and blades 29. Thus, springs 30 tending to urge the stems 27 outwardly and springs 32 tending to urge the blades inwardly, serve to tension and retain the stems and blades of the vanes together during the operation of the clutch unit.

Figure 7:
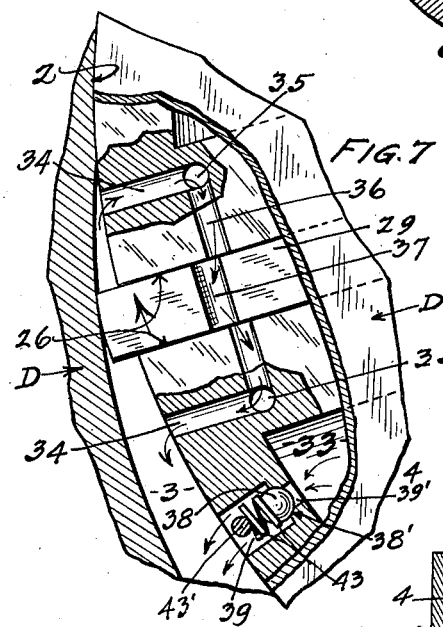
Fig. 7 is an enlarged section of the by-pass structure of Fig. 4 on line 7—7 of Fig. 8.
Figure 9:
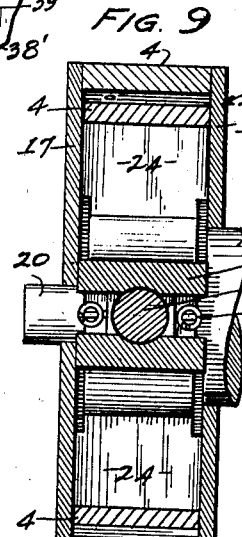
Fig. 9 is a sectional elevation of the assembled clutch members on line 9—9 of Fig. 2.

As shown in Figs. 2, 3, 7 and 8, suitable and effective means is provided in our clutch for controlling the flow of fluid from one to other chambers 3 of the member D at certain points and from the chambers 33 of member D' to chambers 3 of member D so as to provide smoothness of operation, free or restricted flow of the fluid when and as desired, or positive lockage against flow of fluid for positively locking the two members of the clutch together for synchronous rotation. To this end, it will be noted that member D' has a plurality of chambers 33, alternating with the radial portions 24 and said chambers are permanently in communication with each other by means of an annular shallow passage 33' formed on a side (the left hand side as shown in Fig. 3) of member D' adjacent the hub 14 thereof. Also, as shown in Figs. 4, 5, and 7, member D' has a pair of small radial ports 34, 34—one on each side and adjacent one edge of each blade 29—which extend inwardly from the periphery 4 at which points they are open to the chambers 3, and connecting at their inner extremities with transverse passages 35 which, in turn, are open at a face of the member D' and inwardly of one of its side plates as at 17 for communication with alined channels 36, 36 on the face of member D' and are further adapted to be alined with channels 37 on the corresponding edges of blades 29 when said blades are positioned almost at the inner extremities of their stroke during the rotation of member D'. Thus, by-passes are provided for permitting a flow of fluid from one to the other sides of each of the vanes V for completely evacuating the constantly decreasing portions of the chambers 3 as the driven member progresses from one to a succeeding cycle of operation. It will be apparent that unless the channels 37 are in registration with channels 36, no transfer of fluid may be effected and that such a transfer is actually effected only at a time and at points in the revolution of the driven member and of the driving member therearound when displacement of the fluid is necessary and desirable.

Now, inasmuch as the fluid is displaced from one to another of the chambers 3 through ports 34 and passages 35, 36, and 37, and into the chambers 33 of the driven member D' by seepage around the vanes and at other points, under pressure, and all of the available spaces within the clutch are filled with fluid, it is necessary to transfer the fluid from the interior of member D' to the previously exhausted chambers 3 as member D' progresses in each cycle of operation. This is accomplished by means of check valves 38 which are mounted in recesses 39 open at the periphery of member D' for communication with successive chambers 3 and having valve seats 38' for the valves 38 and ports 39' open to chambers 33. Said valves 38 are urged as by means of springs 43 compressed between said valves and pins 43', or otherwise, for holding the valves normally closed and preventing the passage of fluid from chambers 33 to chambers 3. Said valves are opened, however, when pressure of the fluid is built up in the chambers 33 to an extent sufficient to effect the opening of the valves, while pressure in chambers 3 will tend to more positively close the valves.

Fluid for extension of the vanes of clutch C is supplied by means of the unit R which is non-rotatably mounted on an extension 40 of the hub 14 of member D' by suitable means and includes a casing 41 closed at one end by a wall 42 and at the opposite end by a closure 41' of annular character which is threaded into the open end of said casing and is interlocked, as shown in Fig. 3, with an inner annular member 44 held in position by means of a split ring 45 which seats in a groove 46 of extension 40, thereby providing a close fitting closure which when combined with internal elements in casing 41, serve to prevent leakage of the fluid from unit R. Casing 41 is held stationary on frame F inasmuch as pressure pipe 55 is connected therewith for regulating the clutch through operating member 59.

The unit R includes a pair of internal and axially spaced frictionless bearings 47 and 48 adjacent wall 42 and closure member 41', respectively, a pair of annular cupped leather gaskets of U shaped cross section as at 49 and 50 abutting said bearings and having the inner and outer flanges thereof in leak-proof engagement with the periphery of extension 40 and the inner surface of casing 41, respectively. Seated in said gaskets are annular members of U shaped cross section as at 51 and 52, between which, compression springs 53 are held for the purpose of holding the gaskets and associated annular members expanded in spaced relation, thereby providing a chamber 54 between the members 51, 51. Fluid is supplied to chamber 54 through a tube 55 which leads to a cylinder 56 forming a part of a hydraulic ram associated with the operating mechanism shown in Fig. 1. Between unit R and cylinder 56, we may interpose in tube 55 an equalizing unit E for the purpose and of the character shown in said Patent No. 2,201,878, wherein, also, is shown a form of control unit R upon which we have disclosed herein, certain improvements, particularly, with relation to sealing the casing 41 against leakage of fluid, as by means of the closure members 43, 44 and 45. Unit R, therefore, serves as a means for supplying fluid under pressure to the relatively rotatable member D through its hub 14.

Cylinder 56 embodies a piston 57 having a stem 58 which is attached to an operating lever 59 pivotally supported on a frame or bracket 60, as shown in Fig. 1, and which may also be provided with a sector 61, if necessary, whereby to lock the operating lever in a selected position. Cylinder 56 is connected with a fluid supply tank 62 with a check valve 63 interposed between said tank and said cylinder so as to continuously supply fluid to said cylinder during the operation of the mechanism in order to compensate for loss by leakage and thus, to insure the efficient operation of the clutch under all conditions. Check valve 62 is effective for preventing back pressure into tank 62 at any time.

The recesses 31 in the hub of member D' which carry the springs 30 have ports 64 which are open to passages 65 longitudinally formed in the hub 14 and extension 40 of said member D', and extension 40 also has ports 66 affording communication between passages 65 and chamber 54 of control unit R. Thus, pressure created in cylinder 56 through operation of lever 59 is transmitted to chamber 54, passages 55, ports 64 and 66, recesses 31 and the stems 27 of vanes V so as to cause the blades 29 to closely engage the wall of the member D.

Thus, it will be observed that the operating member O, cylinder 56 and unit R, together with their interconnections and the connections between unit R and the vanes V constitute a hydraulic means which is manually operable for applying pressure to said vanes so as to effect the relative or synchronous rotation of members D and D'. Thus, when fluid is permitted to flow through members D and D', even though it is restricted, there will be a differential in the rotation of said members which corresponds to the degree of restriction, when however, the intercommunicating passages in members D and D' are closed, the fluid can not flow from one member to the other, and said members will rotate synchronously and will be locked together.

Attention is directed to the particular form and characteristics of members D and D', wherein it is noted that the outer member has at least one less of the fluid chambers 3 than the number of vanes V on member D' so that at all times there will be at least two effective vanes at any point in the operation of the mechanism. The tension of the springs 32 serve to urge the vanes and their stems inwardly to non-clutching position at which position the outer ends of the vanes are flush with the periphery of member D' and permit the idling of the driving member around the driven member, while the springs 30 are effective only for tensioning the vane blades 29 on and for seating them in the slots of the stems so that the vanes and stems may extend and retract as units. The application of pressure from cylinder 56 to stems 27 overcomes the tension of springs 32 and forces the blades 29 outwardly into chambers 3 to a desired extent. It is apparent, therefore, that the mechanism shown and described herein may be used as a variable transmission unit or as a clutch at the election of an operator, merely by the manipulation of operating member O.

Our mechanism may also embody a brake as will be now explained. For instance the operated unit W may be provided with a contractible brake band 70 and a frictional lining 71 adapted for operation on a drum 72. One end of band 70 is anchored as at 73 to a cross bar 74 of frame F while the other end of band 70 as at 75 is conventionally connected by a link and cam device generally represented at 76 to a lever or bar 77 pivoted and tensioned in an upright frame member 78. A Bowden wire 79 connects the outer end of lever 77 with operating lever O and said wire is enclosed in a flexible tube 80 which is suitably anchored as at 81 and 82.

The brake is arranged to be normally operative to prevent rotation of the members D and W as when the member D is inoperative or is idling, and is released when member O is operated for rendering members D and D' effective as a clutch or transmission means.

Figure 8:
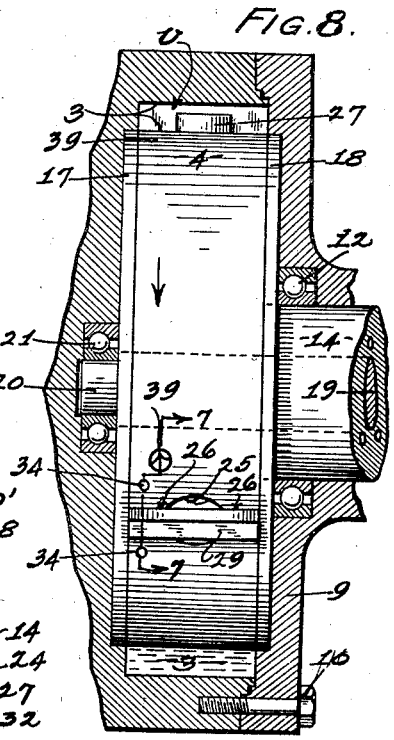
Fig. 8 is an enlarged elevation of the clutch unit with the driven member shown in full and the driving member shown in section.

The provision of the fluid by-pass and pressure balancing means shown in Figs. 4, 5 and 8 insures smoothness of operation under all conditions of usage, and the independent application of pressure to the several vanes V insures uniformity and flexibility as well as easiness of control.

The purpose of springs 30 is to maintain the vanes 29 extended to positions whereby their outer edges will be flush with the periphery of rim 4 of member D', while the springs 32 serve to hold said vanes sealed in the slots 28 of the stems 27. The combined tension of the pairs of springs 32 is balanced with the tension of associated springs 30 when the vanes are retracted to their innermost positions and the extension of the vanes to traverse the eccentric portions of chambers 3 is effected by pressure applied through chambers 31 and against the tension of springs 32. Thus, when pressure in chambers 31 is relieved the vanes will be retracted by springs 32.

When it is desired to rotate member D through member D', operating member 59 is moved to the left (Fig. 1) together with piston 57, thereby creating pressure in cylinder 56, pipe 55, unit R, hub 14 and chambers 31. The torque thus applied to member D corresponds to the extent to which the lever 59 is moved and the continuance of its assumed position. Unit R, thus serves as a stationary medium having continuous pressure connection with the rotatable hub 14 so as to insure pressure behind the vanes at any stage of operation.

The vanes, of course, are extended successively to variable degrees and are retracted against the prevailing pressure in chambers 31 when their outer edges engage the concentric portions 2 and the eccentric portions of chambers 3. Fluid flows from chambers 3 to chambers 33, as shown in Fig. 7 when the vanes are nearing the forward tapering extremities of chambers 3 so as to bypass the fluid into chambers 33 around the vanes to chambers 33. When, however, the vanes are extended so as to move passages 37 out of registration with passages 36, the fluid is trapped in chambers 3 and members D and D' are locked together for synchronous rotation.

What I claim is:

1. A hydraulic clutch comprising: a driving member in the form of a drum, a driven member housed in and coaxial with said driving member, said driven member having a rim portion concentric with its axis, said driving member being internally cored to provide alternating concentric and eccentric surfaces around the rim of said driven member, said concentric surfaces rotatably engaging said rim and said eccentric surface forming fluid chambers outwardly of said rim, a plurality of extensible vanes on said driven member in excess of the number of said chambers adapted to successively engage all of said surfaces during the relative rotation of said driving and driven members, means for connecting said driving and driven members, respectively, with a source of power and an operated element and including a relatively stationary fluid pressure chamber and passages in said driven member for applying pressure from said stationary chamber to said vanes, and manually controlled hydraulic means for regulating the application of pressure to said stationary chamber and said vanes independently and variably to selectively effect and regulate the relative rotation of said clutch members.

2. A hydraulic clutch comprising: coaxial driving and driven members adapted, respectively, for connection with a source of power and an operated element, one of said members being enclosed by the other member, one of said members having an annular concentric portion and the other member having alternating concentric and eccentric portions adjacent the annular portion of the associated member, a plurality of vanes extensibly mounted on one of said members for engaging portions of the associated member, the contour of said members being such as to form fluid chambers at spaced points between said members, and manually controlled hydraulic means including an operating lever and a pressure chamber arranged to individually apply pressure to and for urging said vanes in the direction of and into engagement with the adjacent surfaces of the associated member upon the operation of said lever, whereby to regulate and effect, selectively, the relative or synchronous rotation of said members.

3. A hydraulic clutch comprising: a rotatable outer drum and a coaxially mounted rotatable inner member enclosed by said drum, said drum having a plurality of alternating concentric and eccentric surfaces surrounding the periphery of said inner member, said concentric surfaces rotatably engaging the periphery of said inner member, said eccentric surfaces forming fluid chambers between said drum and said inner member, a plurality of vanes carried by said inner member for extension and retraction relative to said eccentric surfaces for displacing the fluid from said chambers, means providing for the flow of fluid through said inner member to said chambers, and manually operable hydraulic means for effecting and regulating the extension of said vanes so as to effect a driving connection between said drum and said inner member when power is applied to one of said members said manually operable means including a compression cylinder manually controlled and a stationary pressure chamber interposed between the compression cylinder and the vanes.

4. A hydraulic clutch comprising: a rotatable outer drum and a coaxially mounted rotatable inner member enclosed by said drum, said drum having a plurality of alternating concentric and eccentric surfaces surrounding the periphery of said inner member, said concentric surfaces rotatably engaging the periphery of said inner member, said eccentric surfaces forming fluid chambers between said drum and said inner member, a plurality of vanes carried by said inner member for extension and retraction relative to said eccentric surfaces for displacing the fluid from said chambers, means providing for the flow of fluid through said inner member to said chambers, and manually operable hydraulic means for effecting and regulating the extension of said vanes so as to effect a driving connection between said drum and said inner member when power is applied to one of said members said manually operable means including a compression cylinder manually controlled and a stationary pressure chamber interposed between the compression cylinder and the vanes, the number of said vanes exceeding the number of said eccentric fluid chambers so that at least two of said vanes will at all times be operative in said chambers.

5. A hydraulic clutch comprising: a rotatable outer drum and a coaxially mounted rotatable inner member enclosed by said drum, said drum having a plurality of alternating concentric and eccentric surfaces surrounding the periphery of said inner member, said concentric surfaces rotatably engaging the periphery of said inner member, said eccentric surfaces forming fluid chambers between said drum and said inner member, a plurality of vanes carried by said inner member for extension and retraction relative to said eccentric surfaces for displacing the fluid from said chambers, means providing for the flow of fluid through said inner member to said chambers, and manually operable hydraulic means for effecting and regulating the extension of said vanes so as to effect a driving connection between said drum and said inner member when power is applied to one of said members, said manually operable means including a compression cylinder manually controlled and a stationary pressure chamber interposed between the compression cylinder and the vanes.

6. A hydraulic clutch comprising: a rotatable outer drum and a coaxially mounted rotatable inner member enclosed by said drum, said drum having a plurality of alternating concentric and eccentric surfaces surrounding the periphery of said inner member, said concentric surfaces rotatably engaging the periphery of said inner member, said eccentric surfaces forming fluid chambers between said drum and said inner member, a plurality of vanes carried by said inner member for extension and retraction relative to said eccentric surfaces for displacing the fluid from said chambers, means providing for the flow of fluid through said inner member to said chambers, and manually operable hydraulic means for effecting and regulating the extension of said vanes so as to effect a driving connection between said drum and said inner member when power is applied to one of said members, said manually operable means including a compression cylinder manually controlled and a stationary pressure chamber interposed between the compression cylinder and the vanes, and additional fluid flow means including fluid passages on opposite sides of each of said vanes formed in the periphery of said inner member and communicable with said chambers, and passages in said vanes adapted for registration with said first mentioned passages at predetermined points in the relative rotation of said drum and said inner member, for by-passing fluid from one to the other side of each of said vanes, so as to relieve back pressure as the vanes move from said chambers to adjacent concentric portions of the drum.

7. A hydraulic clutch comprising: a rotatable outer drum and a coaxially mounted rotatable inner member enclosed by said drum, said drum having a plurality of alternating concentric and eccentric surfaces surrounding the periphery of said inner member, said concentric surfaces rotatably engaging the periphery of said inner member, said eccentric surfaces forming fluid chambers between said drum and said inner member, a plurality of vanes carried by said inner member for extension and retraction relative to said eccentric surfaces for displacing the fluid from said chambers, means providing for the flow of fluid through said inner member to and from said chambers, and manually operable hydraulic means for effecting and regulating the extension of said vanes so as to effect a driving connection between said drum and said inner member when power is applied to one of said members, said manually operable means including a compression cylinder manually controlled and a stationary pressure chamber interposed between the compression cylinder and the vanes, said fluid flow means including peripheral ports affording passage of fluid from the interior of said inner member at points rearwardly of each of said vanes as they are moved in a given direction, and spring held valves supported for normally closing said ports and preventing fluid from said chambers entering said inner member through said ports but openable by pressure from within said inner member to permit flow of fluid from said inner member to said chambers following the traverse of said chambers by said vanes.

8. A hydraulic clutch comprising: a rotatable outer drum and a coaxially mounted rotatable inner member enclosed by said drum, said drum having a plurality of alternating concentric and eccentric surfaces surrounding the periphery of said inner member, said concentric surfaces rotatably engaging the periphery of said inner member, said eccentric surfaces forming fluid chambers between said drum and said inner member, a plurality of vanes carried by said inner member for extension and retraction relative to said eccentric surfaces for displacing the fluid from said chambers, means providing for the flow of fluid through said inner member to and from said chambers, and manually operable hydraulic means for effecting and regulating the extension of said vanes so as to effect a driving connection between said drum and said inner member when power is applied to one of said members, said manually operable means including a compression cylinder manually controlled and a stationary pressure chamber interposed between the compression cylinder and the vanes, and additional fluid regulating means including fluid passages on opposite sides of each of said vanes formed in the periphery of said inner member and communicable with said chambers, and passages in said vanes adapted for registration with said first mentioned passages at predetermined points in the relative rotation of said drum and said inner member, for by-passing fluid from one to the other side of each of said vanes, so as to relieve back pressure as the vanes move from said chambers to adjacent concentric portions of the drum, peripheral ports affording passage of fluid from the interior of said inner member at points rearwardly of each of said vanes as they are moved in a given direction, and spring held valves supported for normally closing said ports and preventing fluid from said chambers entering said inner member through said ports but openable by pressure from within said inner member to permit flow of fluid from said inner member to said chambers following the traverse of said chambers by said vanes.

9. A hydraulic clutch comprising: telescoping coaxial driving and driven members relatively rotatable and sealed for enclosing a fluid, one of said members being arranged for connection to a source of power and the other member arranged for connection with an operated element, said outer member having a plurality of concentric surfaces and alternating eccentric fluid chambers disposed around said inner member, said inner member having a concentric rim rotatably engaging the concentric surfaces of said outer member, a central hub portion and fluid chambers between said hub and said rim, and radial ribs connecting said hub and said rim, a plurality of extensible and retractible vane units carried by said ribs, each of which units includes a separate stem and blade arranged for common extension and retraction, said ribs being radially bored to slidably receive said stems and transversely slotted to slidably receive said blades, springs associated with said stems and said blades for normally urging the same inwardly, a pressure unit on the hub of said inner member, said hub having independent passages therein affording constant communication between said pressure unit and said vane stems, and manually operable means for applying pressure through said unit and said passages to said vanes for extending the vanes so as to couple said driving and driven members selectively for relative or synchronous rotation.

10. A hydraulic clutch comprising: telescoping coaxial driving and driven members relatively rotatable and sealed for enclosing a fluid, one of said members being arranged for connection to a source of power and the other member arranged for connection with an operated element, said outer member having a plurality of concentric surfaces and alternating eccentric fluid chambers disposed around said inner member, said inner member having a concentric rim rotatably engaging the concentric surfaces of said outer member, a central hub portion and fluid chambers between said hub and said rim, and radial ribs connecting said hub and said rim, a plurality of extensible and retractible vanes carried by said ribs, said vanes including detachably associated blades, said ribs being radially bored to slidably receive said stems and transversely slotted to slidably receive said blades, springs associated with said stems and said blades for normally urging the same inwardly, a stationary pressure unit on the hub of said inner member, said hub having independent passages therein affording constant communication between said pressure unit and said vane stems, and manually operable means for applying pressure through said unit and said passages to said vanes for extending the vanes so as to couple said driving and driven members selectively for relative or synchronous rotation, and fluid by-pass means including cooperating passages in the rim of said inner member and in said blades for transferring fluid from one to the other side of each of said vanes at given points in the rotation thereof.

11. A hydraulic clutch comprising: telescoping coaxial driving and driven members relatively rotatable and sealed for enclosing a fluid, one of said members being arranged for connection to a source of power and the other member arranged for connection with an operated element, said outer member having a plurality of concentric surfaces and alternating eccentric fluid chambers disposed around said inner member, said inner member having a concentric rim rotatably engaging the concentric surfaces of said outer member, a central hub portion and fluid chambers between said hub and said rim, and radial ribs connecting said hub and said rim, a plurality of extensible and retractible vanes carried by said ribs, said ribs being radially formed to slidably receive said vanes, springs associated with said vanes for normally urging the same inwardly, a stationary pressure unit on the hub of said inner member, said hub having independent passages therein affording constant communication between said pressure unit and said vanes, and manually operable means for applying pressure through said unit and said passages to said vanes for extending the vanes so as to couple said driving and driven members selectively for relative or synchronous rotation, and valve controlled means in the rim of said inner member at points rearwardly of each of said vanes when the vanes rotate in a given direction for preventing the passage of fluid from said eccentric chambers to the chambers of said inner member but permitting the flow of fluid in a reverse direction when pressure in said inner member attains a given point following the traverse of the vanes in said eccentric chambers.

12. A hydraulic clutch comprising: telescoping coaxial driving and driven members relatively rotatable and sealed for enclosing a fluid, one of said members being arranged for connection to a source of power and the other member arranged for connection with an operated element, said outer member having a plurality of concentric surfaces and alternating eccentric fluid chambers disposed around said inner member, said inner member having a concentric rim rotatably engaging the concentric surfaces of said outer member, a central hub portion and fluid chambers between said hub and said rim, and radial ribs connecting said hub and said rim, a plurality of extensible and retractible vanes carried by said ribs, said ribs being radially bored to slidably receive said vanes, springs associated with said vanes for normally urging the same inwardly, chambers at the inner extremities of the vanes, a pressure unit on the hub of said inner member, said hub having independent passages therein affording constant communication between said pressure unit and said vane chambers, and manually operable means for applying pressure through said unit and said passages to said vanes for extending the vanes so as to couple said driving and driven members selectively for relative or synchronous rotation, and fluid by-pass means including cooperating passages in the rim of said inner member and in said blades for transferring fluid from one to the other side of each of said vanes at given points in the rotation thereof, and valve controlled means in the rim of said inner member at points rearwardly of each of said vanes when the vanes rotate in a given direction for preventing the passage of fluid from said eccentric chambers to the chambers of said inner member but permitting the flow of fluid in a reverse direction when pressure in said inner member attains a given point following the traverse of the vanes in said eccentric chambers.

CLIFFORD C. GOODSON.
JOHN F. FISCHBECK.